US012083054B2

(12) United States Patent
Giannozzi

(10) Patent No.: US 12,083,054 B2
(45) Date of Patent: Sep. 10, 2024

(54) CHAIR FOR A TREATMENT UNIT, IN PARTICULAR BUT NOT EXCLUSIVELY, AN OPHTHALMIC UNIT

(71) Applicant: COSTRUZIONI STRUMENTI OFTALMICI C.S.O. S.R.L., Scandicci (IT)

(72) Inventor: Franco Giannozzi, Scandicci (IT)

(73) Assignee: COSTRUZIONI STRUMENTI OFTALMICI C.S.O. S.R.L., Scandicci (IT)

( * ) Notice: Subject to any disclaimer, the term of this patent is extended or adjusted under 35 U.S.C. 154(b) by 127 days.

(21) Appl. No.: 17/904,600

(22) PCT Filed: Feb. 16, 2021

(86) PCT No.: PCT/IB2021/051294
§ 371 (c)(1),
(2) Date: Aug. 19, 2022

(87) PCT Pub. No.: WO2021/165829
PCT Pub. Date: Aug. 26, 2021

(65) Prior Publication Data

US 2023/0093806 A1 Mar. 30, 2023

(30) Foreign Application Priority Data

Feb. 21, 2020 (IT) ........................ 102020000003641

(51) Int. Cl.

| | |
|---|---|
| ***A47C 3/20*** | (2006.01) |
| ***A61G 15/02*** | (2006.01) |
| ***A61G 15/06*** | (2006.01) |
| ***A61G 15/10*** | (2006.01) |

(52) U.S. Cl.
CPC ................ *A61G 15/02* (2013.01); *A47C 3/20* (2013.01); *A61G 15/10* (2013.01)

(58) Field of Classification Search
CPC ........ A47C 1/0242; A47C 3/20; A61G 15/02; A61G 15/10
USPC ............................................... 297/330, 344.2
See application file for complete search history.

(56) References Cited

U.S. PATENT DOCUMENTS 3,578,379 A * 5/1971 Taylor ................ A47C 1/03211 297/330 X
3,674,240 A * 7/1972 Larsson ................. A61G 15/02 254/95
3,804,460 A * 4/1974 Leffler ................... A61G 15/02 297/330 X (Continued)

FOREIGN PATENT DOCUMENTS

DE 102010020129 A1 11/2011
FR 2755007 A1 4/1998

OTHER PUBLICATIONS

International Search Report and Written Opinion for Corresponding International Application No. PCT/IB2021/051294, 8 pages, May 21, 2021.

*Primary Examiner* — Rodney B White
(74) *Attorney, Agent, or Firm* — Lucas & Mercanti, LLP

(57) ABSTRACT

Equipment for health care centers is provided which combines, in one unit, a chair, analysis and/or treatment instruments, and various accessories, such as lighting. The equipment can be employed for example in connection with ophthalmic procedures.

8 Claims, 3 Drawing Sheets

(56) References Cited

U.S. PATENT DOCUMENTS

| | | | | | |
|---|---|---|---|---|---|
| 3,934,928 | A * | 1/1976 | Johnson | A61G 15/02 297/330 X |
| 4,600,239 | A * | 7/1986 | Gerstein | A61G 3/06 297/330 X |
| 4,929,023 | A * | 5/1990 | Rasmussen | A61G 15/02 297/330 X |
| 5,528,782 | A * | 6/1996 | Pfeffer | A61G 13/04 297/330 X |
| 5,535,465 | A | 7/1996 | Hannant | |
| 6,106,065 | A * | 8/2000 | Carroll | A47C 1/0347 297/330 X |
| 11,110,023 | B1 * | 9/2021 | Knight | A47C 1/03211 |
| 2015/0282621 | A1 * | 10/2015 | Miller | A47C 7/506 297/344.21 |

* cited by examiner

CHAIR FOR A TREATMENT UNIT, IN PARTICULAR BUT NOT EXCLUSIVELY, AN OPHTHALMIC UNIT

CROSS-REFERENCE TO RELATED APPLICATIONS

This application is a 371 of PCT/IB2021/051294, filed Feb. 16, 2021, which claims the benefit of Italian Patent Application No. 102020000003865, filed Feb. 21, 2020.

FIELD OF THE INVENTION

The present invention relates to the field of treatment units, that is equipment for health care centers or the like, that combine, in one unit, a chair and analysis and/or treatment instruments, in addition to various accessories, for example lighting means. The object of the invention in particular is a chair for a treatment unit specifically intended for ophthalmic use, although it does not exclude use in treatment units of other type.

Background of the Invention

Different eye diagnostic and treatment devices are used in ophthalmology, which are generally installed on individual tables or on multiple structures, in a support configuration that may be more or less complex but that generally consists of an instrument support group and a chair for the patient, to form the so-called treatment unit.

In certain cases where extreme sizes and distances are required due to the needs of particular patients (due to physical complexion, condition, etc.), displacement needs arise that, in the present disclosure, relate in particular to the chair. A rather common case arises from the need to examine a patient on a wheelchair, in any case unable to be moved to the chair. In these cases, there is a need to move the chair so as to be able to completely remove it from the treatment unit, making space for the wheelchair.

Treatment units are known in which the chair is removable through a system of mechanical, electromechanical or electrical hooks, which however have a given constructive complexity and a complicated operation, which among other things, makes multiple and additional controls necessary. In certain cases, the possibility of movement is directionally limited (notably on a track), which makes the solution unsuitable where spaces are tight or in any case, where there is the need to vary as desired the exit displacement direction of the chair.

A known chair support is also disclosed in DE102010020129. It comprises a platform for resting over the ground, and a movable part fixed with the seat and movable with respect to the platform along an elevation axis. A motorization controls the displacement of the movable part with respect to the platform, conversely varying the elevation of the seat. The platform comprises a pedestal resting over the ground thereby generating a static friction therewith, operationally engaged with the movable part and a trolley arrangement moving over the ground with rolling resistance, unlocked with respect to the pedestal at least according to the elevation axis and not preventing the pedestal from taking a chair locking position in contact with the ground. Pusher members are fixed and upwards projecting with the trolley arrangement, to be struck by the movable part when it moves downwards along the elevation axis under a predetermined reference height, and to exert a reaction force that lifts the pedestal from the ground towards a release position of the chair, pursuant to a further downwards movement of the movable part. Conversely, in the chair release position the weight of the chair is born only by the trolley arrangement.

SUMMARY OF THE INVENTION

Within the context of such a solution, according to which, once released from the regular operating position the chair can be removed substantially in any direction, leaving the space previously occupied completely free from obstacles capable of hindering the entry of a wheelchair, the object of the present invention is to provide a structural arrangement that, contrary to known solution, is at the same time highly effective and reliable, compact and aesthetically attractive.

This and other objects are achieved by the chair for a treatment unit according to the invention, in particular but not exclusively an ophthalmic unit, the essential features of which are defined in the first of the appended claims.

Further important features are the subject of the appended claims.

BRIEF DESCRIPTION OF THE DRAWINGS

The features and advantages of the chair for a treatment unit, in particular but not exclusively an ophthalmic unit, according to the present invention will become apparent from the following description of an embodiment thereof, provided by way of non-limiting example with reference to the appended drawings, in which.

DETAILED DESCRIPTION OF THE INVENTION

Figure 1:
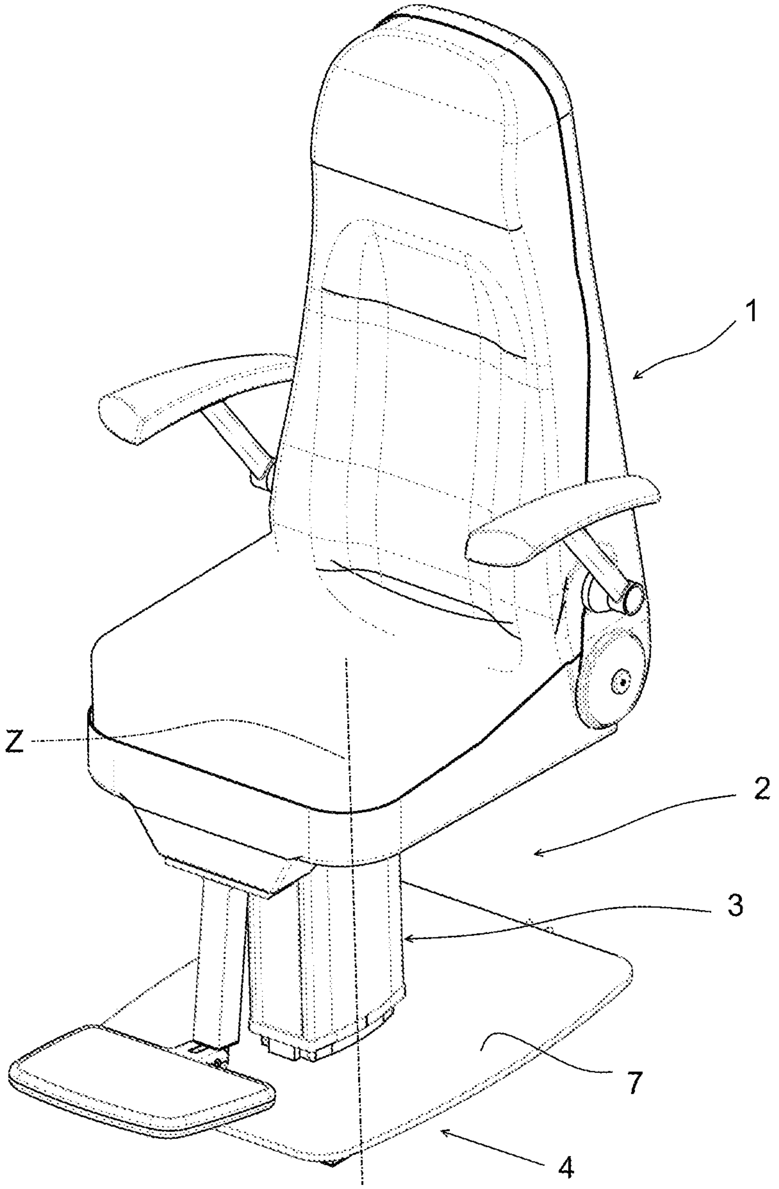
FIG. 1 is an axonometric view of a chair for a treatment unit according to the present invention.

With reference to the above figures, the chair according to the invention has a seat 1 of any morphology and configuration in itself known, which is not the object of this invention, and a support base 2, which supports the seat, thus forming the structure that rests on the ground plane indicated by S. Again in a known manner the base 2 has a telescopic pillar 3 which rises from a platform 4, the latter element defining the contact and resting surface of the chair on the ground. The pillar 3 comprises a fixed core 5 which rises from the platform 4, and a movable tubular sheath 6 having a lower free end 61, which slides over the fixed core along a height elevation axis or direction Z, which is orthogonal to the platform and to the seat plane, and is fixed to the seat itself. A motor which actuates the sheath 6 with respect to the core 5 to control the raising degree of the seat is arranged, with the relative drive means, in the sheath 6, at the high part thereof. The motor and the drive means are not depicted, being of known type and in themselves outside the scope of this invention.

Figure 2:
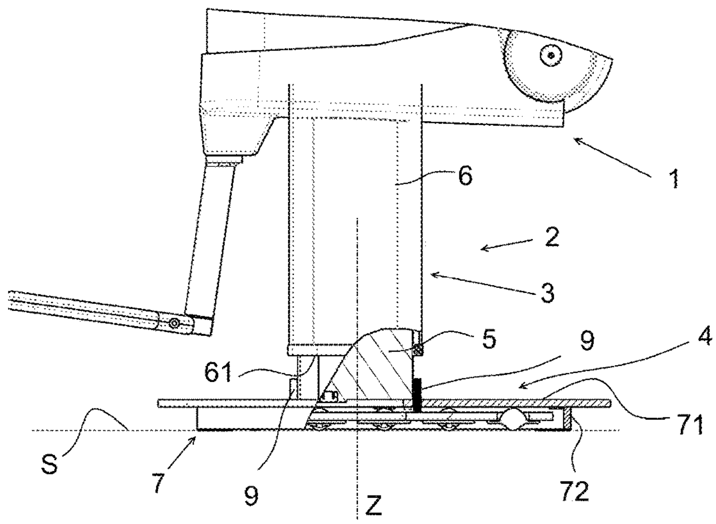
FIG. 2 is a partially sectioned side view of a support base of the chair in FIG. 1, in a locking configuration (or inactivity of the release system)
Figure 3:
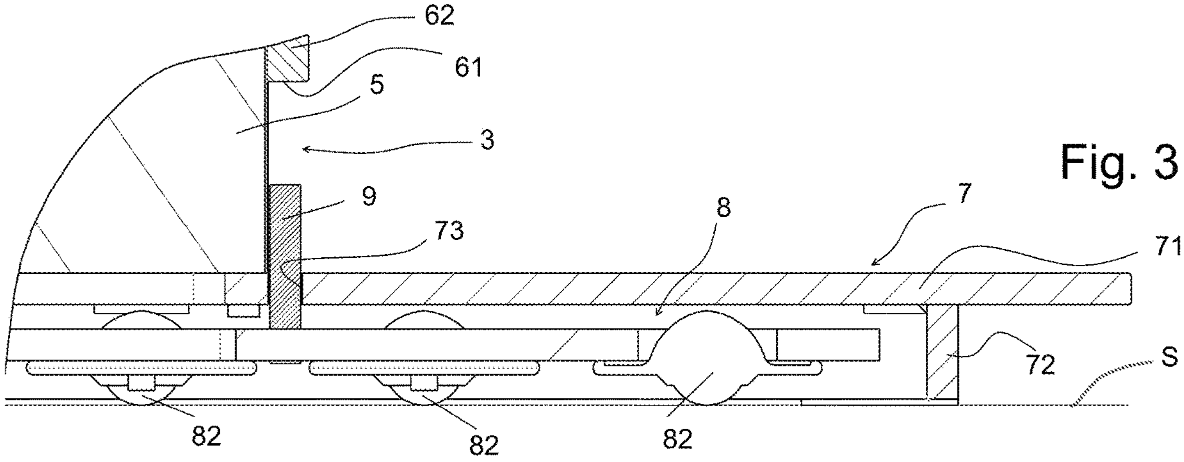
FIG. 3 shows an enlarged view of the sectioned area of FIG. 2.

The platform 4 comprises a pedestal 7 to which the fixed part of the pillar 3 is fixed, notably in this case the core 5, and which defines the contact surface with the ground for bearing the weight of the structure (and of the user thereof) in a stable position of use, as in the locked configuration in FIGS. 2 and 3, and in which the seat is raised above a predetermined reference height, as discussed hereafter.

According to the invention the pedestal 7 consists of an outer box-like body, generically cup-shaped with a top wall 71 and a peripheral skirt 72, which with the lower end thereof, rests on the plane S, thus generating the static friction that stabilizes the structure against the displacements over the plane itself.

The platform according to the invention further comprises rolling means 8, here in the form of a trolley 8 with frame 81 and wheels 82 (but in generally, rolling bodies such as spheres) housed in the body or pedestal 7. Pusher means 9 projecting past the top wall 71 of the pedestal 7 rise from the frame 81 (fixed thereto), thus being inserted in windows 73 formed in the top wall itself in a free slidable manner. More specifically, the pusher means, and therefore also the relative passage windows, are arranged adjacent to two or more side walls of the core 5 of the pillar 3. If the latter has a substantially quadrilateral cross-section, there can be advantageously two pusher means as in the example, against two mutually opposite walls of the core. The members may be parallelepiped in shape, with adequate sizing according to the functional and load needs. The size in height of the trolley is such that when the pedestal is resting on the ground in the locked configuration (stable position of use), the trolley itself does not interfere with the pedestal, rather preferably leaving a given clearance in the direction of elevation. In practice, the trolley has a size, in the direction of elevation, that is less than or at most equal to the height of the skirt 72.

The position of the pusher means 9 is such that when the seat 1 is lowered, and accordingly the lower end of the movable sheath 6 ending with an edge 61 is lowered, past (that is, below) a given height, which is predetermined by the height of the pusher means 9, the aforesaid sheath edge hits the pusher means. At this point, continuing the relative actuation of motion between sheath and core, continuing to lower the seat, the hit on the pusher means 9 generates a reaction force that causes the pedestal 7 to be raised from the ground, assisted and guided by the sliding engagement between the pusher means 9 and the passage windows 73.

Figure 4:
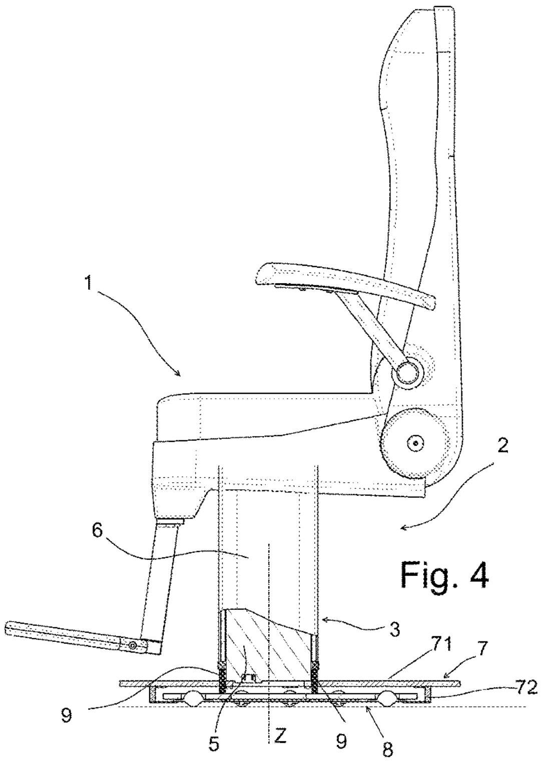
FIG. 4 is a side view again of the chair with the support base sectioned, in a release configuration (therefore, with the release system enabled)
Figure 6:
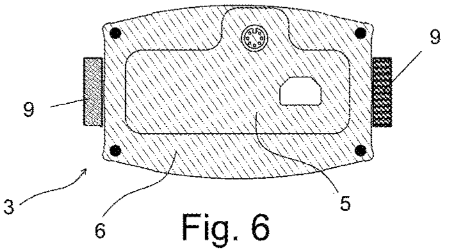
FIG. 6 is a cross-section of a telescopic pillar of the base shown in the figures above, taken along a horizontal plane (that is, parallel to the ground plane bearing the chair) close to a ground support platform, which in turn is part of the support base.
Figure 5:
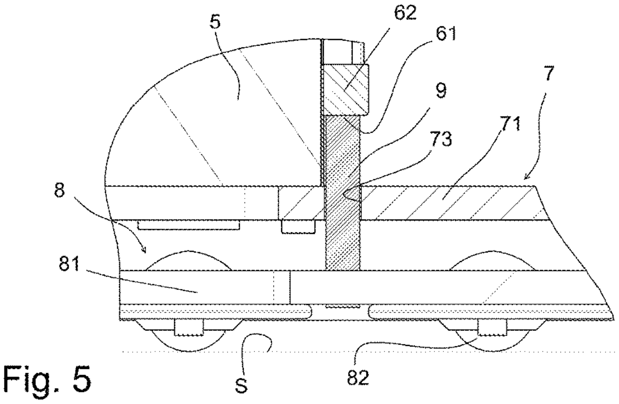
FIG. 5 enlarges the sectioned region of FIG. 4.

As shown in FIGS. 4 and 5, the weight of the structure at this point is borne only by the trolley 8, and the pedestal which is slightly raised from and off the ground removes the stabilizing friction of the (locking) configuration described above. The chair may thus be freely moved, basically in any direction. It is sufficient to slightly raise the platform for the chair to take on the released configuration; to this purpose, the height of the pusher means may be limited to what is strictly required to be actuated, close to the lower stroke end of the sheath 6. To make the engagement more reliable and steady, the lower edge 61 of the sheath may advantageously be provided with one or more feet 62 made of suitable material. In regard to materials, due to mechanical, wear-proof and cushioning needs, the preferred materials for the pusher means 9 and possibly the feet 62 may comprise materials such as hard rubber, at least at the level of a lining layer. Speaking of cushioning, solutions can also be implemented that make the pusher means less rigid, for example through springs or sections of material with some elastic or viscoelastic property.

The invention thus comprises a platform that provides trolley means and a pedestal for resting on the ground with static friction (in a condition of use of the chair with seat raised past a given predetermined reference height), free to be raised with respect to the trolley, that is, released along the elevation direction Z, and to relative pusher means that rise solid from the trolley itself, the pusher means being adapted to exert a reaction force that rises the resting pedestal from the ground when the seat descends below the aforesaid predetermined reference height, therefore absorbing the load of the chair and causing it to be borne by the trolley, with subsequent possibility of displacement.

It is apparent from the above how, according to the invention, the release system in practice is managed with the utmost simplicity by the same system for operating the raising of the seat, and therefore through a minimal structural adaption that takes advantage of members that are substantially already provided, without any complication resulting from additional (also control) devices or systems. It should also be noted how the system does not create any restraint to the direction for leaving the chair, nor does it use guide or locking systems provided on the ground, which remains perfectly free and smooth once the structure is moved.

The structure of the pedestal with an outer box-like body, generally cup-shaped with a top wall and a peripheral skirt that at its lower edge rests on the ground plane, housing, hiding and protecting the trolley means, makes the arrangement compact, aesthetically pleasant, safe, effective and reliable, ensuring a particularly steady and solid lock in the locking position.

Again, it should be noted that although the telescopic pillar as described above is basically an advantageous embodiment, the invention may more generally be implemented with different movable configurations.

The present invention was described hereinto with reference to a preferred embodiment thereof. It is intended that other embodiments may exist which relate to the same inventive core, falling within the scope of protection of the claims indicated below.

The invention claimed is:

1. A chair for a treatment unit, for an ophthalmic unit, comprising a seat, a support base supporting said seat in elevation from a ground plane along an elevation axis (Z), said support base comprising a platform for resting over the ground plane, a movable part fixed with said seat and movable with respect to said platform along said elevation axis (Z), and motorized drive means adapted to control the displacement of said movable part with respect to said platform, conversely varying the elevation of said seat with respect to the ground plane along the elevation axis (Z), wherein said platform comprises: a pedestal adapted to rest over the ground plane thereby generating a static friction therewith, operationally engaged with said movable part; trolley means adapted to move over the ground plane with rolling resistance, unlocked with respect to said pedestal at least according to the elevation axis (Z) and not preventing the pedestal from taking a chair locking position in contact with the ground plane; pusher means being provided in a fixed and upwards projecting arrangement with respect to said trolley means, adapted to be struck by said movable part when the movable part moves downwards along the elevation axis (Z) under a predetermined reference height, and to exert a reaction force that lifts said pedestal from the ground plane towards a release position of the chair, pursuant to a further downwards movement of said movable part, whereby in the chair release position the weight of the chair is born only by said trolley means, wherein said trolley means comprise a frame from which said pusher means elevates, and rolling elements pivotally supported by said frame, wherein said pedestal comprises an outer box shaped body, generally cup-shaped with a top wall and a peripheral skirt having a lower edge adapted to rest on the ground plane, said trolley means being arranged inside said box shaped body and having a size, measured along said elevation axis (Z) equal to or lower than the size of said skirt.

2. The chair according to claim 1, wherein said pusher means projects over said top wall of the pedestal, inserting in freely slidable manner within windows formed in said top wall.

3. The chair according to claim 1, wherein said movable part of said support base comprises a tubular sheath connected with said seat and engaged, to form a telescopically extensible pillar, with a fixed core that rises from said pedestal, solid thereto, said sheath being adapted to abut against said pusher means at a lower free end.

4. The chair according to claim 3, wherein said lower free end of said sheath provides at least one foot adapted to hit against said pusher means.

5. The chair according to claim 3, wherein said motorized drive means is arranged within said sheath.

6. The chair according to claim 3, wherein said pusher means comprises two or more pushing locks arranged close to respective side walls of said core.

7. The chair according to claim 3, wherein said pusher means comprises two or more pushing locks having a parallelepiped shape.

8. The chair according to claim 1, wherein at least said pusher means comprises, at least in a lining layer, a wear-proof material and/or with cushioning properties.

* * * * *